(12) United States Patent
Djelouah et al.

(10) Patent No.: US 12,120,359 B2
(45) Date of Patent: Oct. 15, 2024

(54) MACHINE LEARNING MODEL-BASED VIDEO COMPRESSION

(71) Applicants: Disney Enterprises, Inc., Burbank, CA (US); ETH Zürich (EIDGENÖSSISCHE TECHNISCHE HOCHSCHULE ZÜRICH), Zürich (CH)

(72) Inventors: Abdelaziz Djelouah, Zürich (CH); Leonhard Markus Helminger, Zurich (CH); Roberto Gerson De Albuquerque Azevedo, Zurich (CH); Scott Labrozzi, Cary, NC (US); Christopher Richard Schroers, Uster (CH); Yuanyi Xue, Kensington, CA (US)

(73) Assignees: Disney Enterprises, Inc., Burbank, CA (US); ETH Zürich (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 385 days.

(21) Appl. No.: 17/704,692

(22) Filed: Mar. 25, 2022

(65) Prior Publication Data
US 2022/0329876 A1 Oct. 13, 2022

Related U.S. Application Data

(60) Provisional application No. 63/255,280, filed on Oct. 13, 2021, provisional application No. 63/172,315, filed on Apr. 8, 2021.

(51) Int. Cl.
*H04N 19/89* (2014.01)
*G06N 3/088* (2023.01)

(52) U.S. Cl.
CPC ............. *H04N 19/89* (2014.11); *G06N 3/088* (2013.01)

(58) Field of Classification Search
CPC ...................................................... H04N 19/89
(Continued)

(56) References Cited

U.S. PATENT DOCUMENTS

2021/0067808 A1   3/2021   Schroers
2021/0099731 A1   4/2021   Zhai
(Continued)

FOREIGN PATENT DOCUMENTS

JP   2020-136884       8/2020
JP   2020136884  A     8/2020
WO   2020/107877 A1    6/2020

OTHER PUBLICATIONS

Office Action dated Aug. 29, 2023 for JP Application 2022-062152.
(Continued)

*Primary Examiner* — Yulin Sun
(74) *Attorney, Agent, or Firm* — Farjami & Farjami LLP (57) ABSTRACT

A system processing hardware executes a machine learning (ML) model-based video compression encoder to receive uncompressed video content and corresponding motion compensated video content, compare the uncompressed and motion compensated video content to identify an image space residual, transform the image space residual to a latent space representation of the uncompressed video content, and transform, using a trained image compression ML model, the motion compensated video content to a latent space representation of the motion compensated video content. The ML model-based video compression encoder further encodes the latent space representation of the image space residual to produce an encoded latent residual, encodes, using the trained image compression ML model, the latent
(Continued)

space representation of the motion compensated video content to produce an encoded latent video content, and generates, using the encoded latent residual and the encoded latent video content, a compressed video content corresponding to the uncompressed video content.

20 Claims, 6 Drawing Sheets

(58) Field of Classification Search
USPC .................................................. 375/240.27
See application file for complete search history.

(56) References Cited

U.S. PATENT DOCUMENTS

| | | | |
|---|---|---|---|
| 2021/0299573 A1* | 9/2021 | Pourabolghasem | .... A63F 13/75 |
| 2021/0334651 A1* | 10/2021 | Leng | ...................... G01S 17/894 |
| 2021/0360233 A1* | 11/2021 | Ishtiaq | .................. H04L 65/764 |
| 2021/0400460 A1* | 12/2021 | Han | ....................... H04W 24/08 |
| 2022/0021887 A1* | 1/2022 | Banerjee | .............. H04N 19/115 |
| 2022/0103839 A1 | 3/2022 | Van Rozendaal | |

OTHER PUBLICATIONS

Eirikur Agustsson, Michael Tschannen, Fabian Mentzer, Radu Timofte, and Luc Van Gool. Generative adversarial networks for extreme learned image compression. In *the IEEE InternationalConference on Computer Vision (ICCV)*, Oct. 2019.
Johannes Ballé, Valero Laparra, and Eero P. Simoncelli. End-to-end optimized image compression. *CoRR*, abs/1611.01704, 2016.
Johannes Ballé, David Minnen, Saurabh Singh, Sung Jin Hwang, and Nick Johnston. Variational image compression with a scale hyperprior. *ICLR*, 2018.
Lucas Beyer, Xiaohua Zhai, Amélie Royer, Larisa Markeeva, Rohan Anil, and Alexander Kolesnikov. Knowledge distillation: A good teacher is patient and consistent. arXiv preprint arXiv:2106.05237, 2021.
Andrew Brock, Jeff Donahue, and Karen Simonyan. Large scale GAN training for high fidelity natural image synthesis. *CoRR*, abs/1809.11096, 2018.
Ting-Yun Chang and Chi-Jen Lu. Tinygan: Distilling biggan for conditional image generation. *CoRR*, abs/2009.13829, 2020.
Abdelaziz Djelouah, Joaquim Campos, Simone Schaub-Meyer, and Christopher Schroers. Neural inter-frame compression for video coding. In *Proceedings of the IEEE International Conference on Computer Vision*, pp. 6421-6429. 2019b.
Leonhard Helminger, Abdelaziz Djelouah, Markus Gross, and Christopher Schroers. Lossy image compression with normalizing flows. arXiv preprint arXiv:2008.10486, 2020.
Diederik P. Kingma and Jimmy Ba. Adam: A method for stochastic optimization. In Yoshua Bengio and Yann LeCun, editors, 3rd International Conference on Learning Representations, ICLR 2015, San Diego, CA, USA, May 7-9, 2015, *Conference Track Proceedings*, 2015.
Théo Ladune, Pierrick Philippe, Wassim Hamidouche, Lu Zhang, and Olivier Déforges. Conditional coding for flexible learned video compression. arXiv preprint arXiv:2104.07930, 2021.
Guo Lu, Wanli Ouyang, Dong Xu, Xiaoyun Zhang, Chunlei Cai, and Zhiyong Gao "DVC: An End-to-end Deep Video Compression Framework" In IEEE *Conference on Computer Vision and Pattern Recognition*, CVPR 2019, Long Beach CA, USA, Jun. 16-20, 2019, pp. 11006-11015. Computer Vision Foundation/IEEE, 2019a.
Theo Ladune, Pierrick Philippe, Wassim Hamidouche, Lu Zhang, Olivier Deforges "Optical Flow and Mode Selection for Learning-based Video Coding" MMSP 2020, IEEE 22nd International Workshop on Multimedia Signal Processing, Sep. 2020, Tampere, Finland. hal-02911680 6 Pgs.
Guo Lu, Wanli Ouyang, Dong Xu, Xiaoyun Zhang, Chunlei Cai, Zhiyong Gao "DVC: An End-to-end Deep Video Compression Framework" 2019 IEEE/CVF Conference on Computer Vision and Pattern Recognition (CVPR) 10 Pgs.
Siwei Ma, Xinfeng Zhang, Chuanmin Jia, Zhenghui Zhao, Shiqi Wang and Shanshe Wang "Image and Video Compression with Neural Networks: A Review" IEEE Transactions on Circuits and Systems for Video Technology Apr. 2019 16 Pgs.
Ties van Rozendall, Iris A.M. Huijben, Taco S. Cohen "Overfitting for Fun and Profit: Instance-Adaptive Data Compression" ICLR 2021 Conference Jan. 2021 18 Pgs.
Ting-Yun Chen, Chi-Jen Lu "TinhGAN: Distilling BigGAN for Conditional Image Generation" ACCV 2020. Lecture Notes in Computer Science, vol. 12625 16 Pgs.
Office Action dated Nov. 29, 2023 for Korean Patent Application 10-2022-0041682.
Abdelaziz Djelough, Joaquim Campos, Simone Schaub-Meyer, Christopher Schroers "Neural Inter-Frame Compression for Video Coding" 2019 IEEE/CVF International Conference on Computer Vision (IVVC). pp. 6420-6428.
Fabian Mentzer, George Toderici, Michael Tschannen, Eirikur Agustsson "High-Fidelity Generative Image Compression" 34th Conference on Neural Information Processing Systems (NeurIPS 2020), Vancouver, Canada pp. 1-20.
Ties van Rozendaal, Iris A.M. Huijben, Taco S. Cohen "Overfitting for Fun and Profit: Instance-Adaptive Data Compression" Published as a Conference Paper at ICLR 2021 pp. 1-18.
Ying-Yun Chang and Chi-Jen Lu "TinyGAN: Distilling BigGAN for Conditional Image Generation" Institute of Informational Science, Academia Sinica, Taiwan. pp. 1-21.
Extended European Search Report dated Sep. 7, 2022 for EP Application 22165396.0. 12 Pgs.
Theo Ladune, Pierrick Philippe, Wassim Hamidouche, Lu Zhang, Olivier Deforges "Optical Flow and Mode Selection for Learning-based Video Coding" Aug. 6, 2020 6 Pgs.
Guo Lu, Wanli Ouyang, Dong Xu, Xiaoyun Zhang, Chunlei Cai, Zhiyong Gao "DVC: An End-to-end Deep Video Compression Framework" 2019 IEEE/CVF Conference on Cmputer Vision and Pattern Recognition (CVPR) pp. 10998-11007.
Siwei Ma, Xinfeng Zhang, Chuanmin Jia, Zhenghui Zhao, Shiqi Wang, Shanshe Wang "Image and Video Compression with Neural Networks: A Review" IEEE Transactions on Circuits and Systems for Video Technology Apr. 10, 2019 16 Pgs.
Adam Golinski, Reza Pourreza, Yang Yang, Guillaume Sautiere, Taco S. Cohen "Feedback Recurrent Autoencoder for Video Compression" Apr. 9, 2020 29 Pgs.
Leonhard Helminger, Roberto Azevedo, Abdelaziz Djelouah, Markus Gross, Christopher Schroers "Microdosing: Knowledge Distillation for GAN based Compression" 2021 13 Pgs.
Extended European Search Report dated Oct. 10, 2022 for EP Application 22165891.7.
Ting-Yun Chang and Chi-Jen Lu "TinyGAN: Distilling BigGAN for Conditional Image Generation" Institute of Informational Science, Academia Sinica, Taiwan 2020.

* cited by examiner

MACHINE LEARNING MODEL-BASED VIDEO COMPRESSION

RELATED APPLICATIONS

The present application claims the benefit of and priority to Provisional Patent Application Ser. No. 63/172.315, filed Apr. 8, 2021, and titled "Neural Network Based Video Codecs," and Provisional Patent Application Ser. No. 63/255,280, filed Oct. 13, 2021, and titled "Microdosing For Low Bitrate Video Compression," which are hereby incorporated fully by reference into the present application.

BACKGROUND

Video content represents the majority of total Internet traffic and is expected to increase even more as spatial resolution frame rate, and color depth of videos increase and more users adopt earning services. Although existing codecs have achieved impressive performance, they have been engineered to the point where adding further small improvements is unlikely to meet future demands. Consequently, exploring fundamentally different ways to perform video coding may advantageously lead to a new class of video codecs with improved performance and flexibility.

For example, one advantage of using a trained machine learning (ML) model, such as a neural network (NN), in the form of a generative adversarial network (GAN) for example, to perform video compression is that it enables the ML model to infer visual details that it would otherwise be costly in terms of data transmission, obtain. However, training ML models such as GANs is typically challenging because the training alternates between minimization and maximization steps to converge to a saddle point of the loss function. The task becomes more challenging when considering the temporal domain and the increased complexity it introduces.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, video content represents the majority of total Internet traffic and is expected to increase even more as spatial resolution frame rate, and color depth of videos increase and more users adopt streaming services. Although existing codecs have achieved impressive performance, they have been engineered to the point where adding further small improvements is unlikely to meet future demands. Consequently, exploring fundamentally different ways to perform video coding may advantageously lead to a new class of video codecs with improved performance and flexibility.

For example, and as further noted above, one advantage of using a trained machine learning (ML) model, such as a neural network (NN), in the form of a generative adversarial network (GAN) for example, to perform video compression is that it enables the ML model to infer visual details that it would otherwise be costly in terms of data transmission, to obtain. However, training ML models such as GANs is typically challenging because the training alternates between minimization and maximization steps to converge to a saddle point of the loss function. The task becomes more challenging when considering the temporal domain and the increased complexity it introduces if only because of the increased data.

The present application discloses a framework based on knowledge distillation and latent space residual to use any adversarially trained image compression ML model as a basis to build a video compression codec that has similar hallucination capacity to a trained GAN which is particularly important when targeting low bit-rate video compression. The images resulting from the present ML model-based video compression solution are visually pleasing without requiring a high bit-rate. Some image details synthesized when using an ML model-based video codec may look realistic while deviating slightly from the ground truth. Nevertheless, the present ML model-based video compression solution is capable of providing image quality that would be impossible using the same amount of transmitted data in conventional approaches. Moreover, in some implementations, the present ML model-based based video compression solution can be implemented as substantially automated systems and methods.

It is noted that, as used in the present application, the terms "automation," "automated," and "automating" refer to systems and processes that do not require the participation of a human user, such as a human editor or system administrator. Although, in some implementations, a human system administrator may review the performance of the automated systems operating according to the automated processes described herein, that human involvement is optional. Thus, the processes described in the present application may be performed under the control of hardware processing components of the disclosed systems.

It is further noted that, as defined in the present application, the expression "machine learning mode" (hereinafter "ML model") refers to a mathematical model for making future predictions based on patterns learned from samples of data obtained from a set of trusted known matches and known mismatches, known as training data. Various learning algorithms can be used to map correlations between input data and output data. These correlations form the mathematical model that can be used to make future predictions on new input data. Such a predictive model may include one or more logistic regression models, Bayesian models, or NNs, for example. In addition, machine learning models may be designed to progressively e their performance of a specific task.

A "deep neural network" (deep NN), in the context of deep learning, may refer to an NN that utilizes multiple hidden layers between input and output layers, which may allow for learning based on features not explicitly defined in raw data. As used in the present application, a feature labeled as an NN refers to a deep neural network. In various implementations, NNs may be utilized to perform image processing or natural-language processing. Although the present novel and inventive principles are described below by reference to an exemplary NN class known as GANs, that characterization is provided merely in the interests of conceptual clarity. More generally, the present ML model-based video compression solution may be implemented using other types of ML models, and may be particularly advantageous when used with ML models that are onerous, expensive, or time consuming to train.

Figure 1:
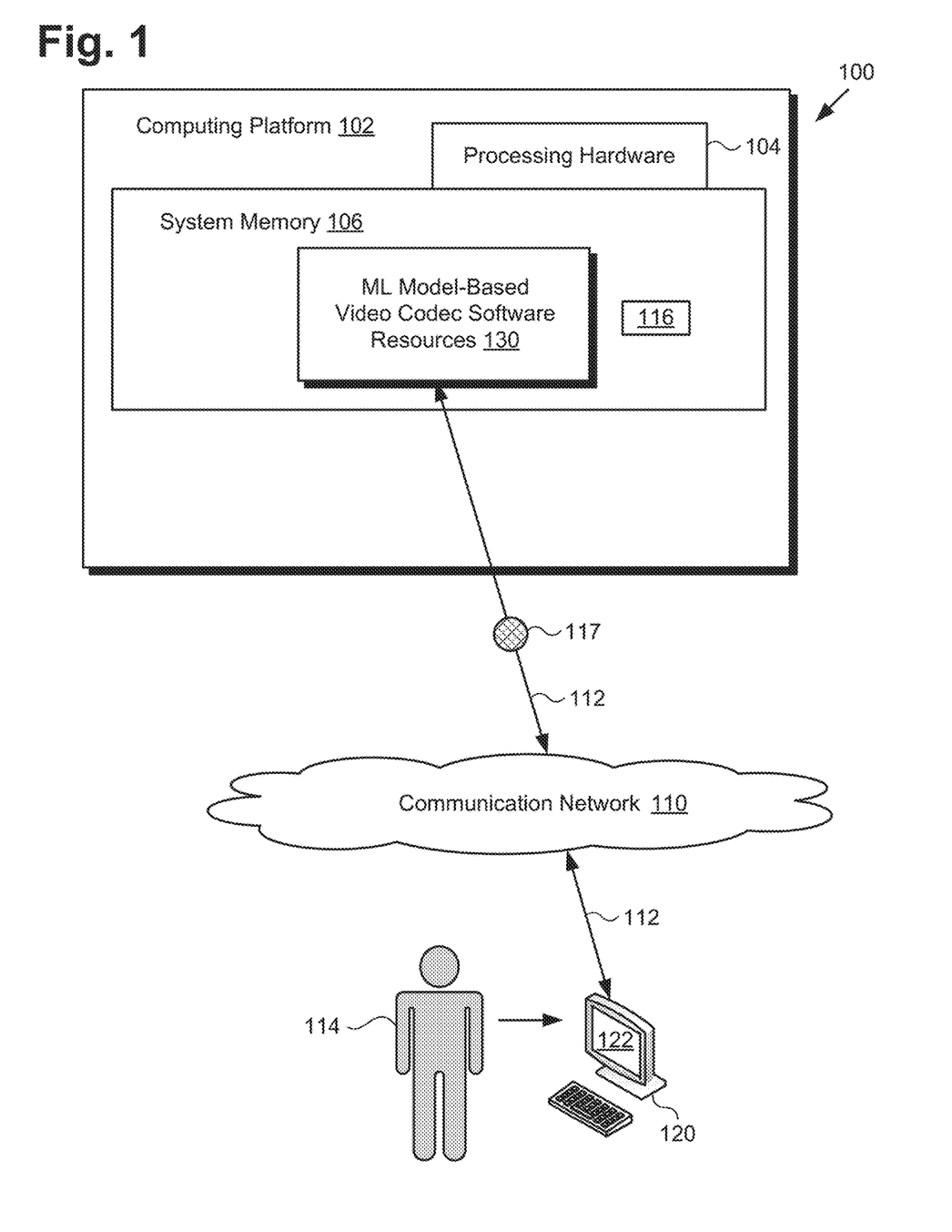
FIG. 1 shows a diagram of an exemplary system for performing machine learning (ML) model-based video compression, according to one implementation.

FIG. 1 shows an exemplary system for performing ML model-based video compression, according to one implementation. As shown in FIG. 1, system 100 includes computing platform 102 having processing hardware 104 and system memory 106 implemented as a computer-readable non-transitory storage medium. According to the present exemplary implementation, system memory 106 stores uncompressed video content 116 and ML, model-based codec software resources 130.

As further shown in FIG. 1, system 100 is implemented within a use environment including communication network 110, user system 120 configured for use by user 114 and including display 122. In addition, FIG. 1 shows network communication links 112 interactively connecting user system 120 with system 100 via communication network 110. Also shown in FIG. 1 is compressed video content 117 output by system 100 and corresponding to uncompressed video content 116.

Although the present application refers to ML model-based codec software resources 130 as being stored in system memory 106 for conceptual clarity, more generally system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, although FIG. 1 depicts ML model-based codec software resources 130 as being stored in their entirety in system memory 106 that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100. Consequently, in some implementations, one or more of the features of ML model-based codec software resources 130 described below may be stored remotely from one another on the distributed memory resources of system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as ML model-based codec software resources 130, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers, accessible over communication network 110 in the form of a packet-switched network such as the Internet, for example. Moreover, in some implementations, communication network 110 may be a high-speed network suitable for high performance computing (HPC), for example a 10 GigE network or an Infiniband network. In some implementations, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

According to the implementation shown by FIG. 1, user 114 may utilize user system 120 to interact with system 100 over communication network 110. User system 120 and communication network 110 enable user 114 to obtain compressed video content 117 corresponding to uncompressed video content 116 from system 100. Although user system 120 is shown as a desktop computer in FIG. 1, that representation is provided merely as an example. More generally, user system 120 may be any suitable mobile or stationary computing device or system that implements data processing capabilities sufficient to provide a user interface, support connections to communication network 110, and implement the functionality ascribed to user system 120 herein. For example, in some implementations, user system 120 may take the form of a laptop computer, tablet computer, smartphone, or game console, for example. However, in other implementations user system 120 may be a "dumb terminal" peripheral component of system 100 that enables user 114 to provide inputs via a keyboard or other input device, as well as to video content via display 122. In those implementations, user system 120 and display 122 may be controlled by processing hardware 104 of system 100.

With respect to display 122 of user system 120, display 122 may be physically integrated with user system 120 or may be communicatively coupled to but physically separate from user system 120. For example, where user system 120 is implemented as a smartphone, laptop computer, or tablet computer, display 122 will typically be integrated with user system 120. By contrast, where user system 120 is implemented as a desktop computer, display 122 may take the form of a monitor separate from user system 120 in the fora of a computer tower. Moreover, display 122 may take the form of a liquid crystal display (LCD), a light-emitting diode (LED) display, an organic light-emitting diode (OLED) display, a quantum dot (QD) display, or a display using any other suitable display technology that performs a physical transformation of signals to light.

Figure 2A:
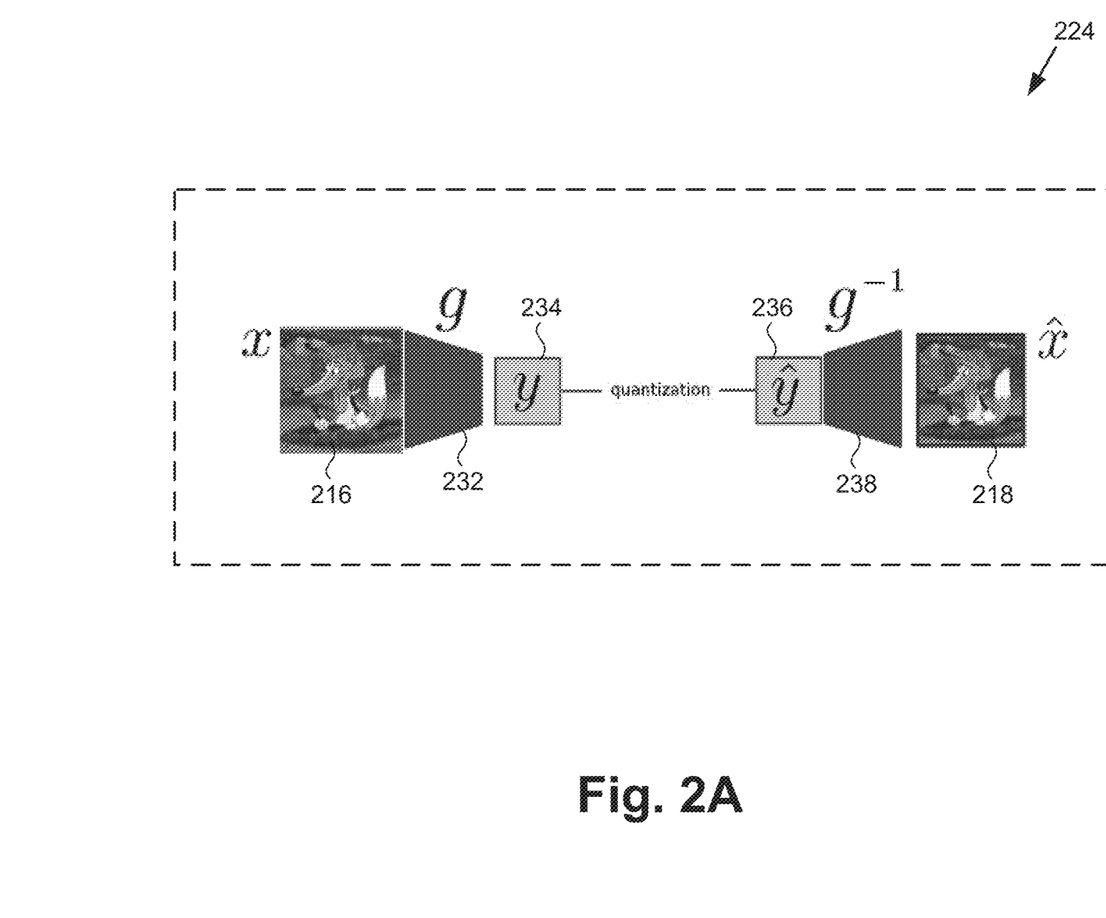
FIG. 2A shows a diagram of an exemplary ML model-based video codec architecture, according to one implementation.

ML model-based codec software resources 130 are further described below by reference to FIGS. 2A, 2B, and 2C. Referring to FIG. 2A, FIG. 2A shows a diagram of exemplary ML model-based video codec architecture 224, according to one implementation. As shown in FIG. 2A, ML model-based video codec architecture 224 includes trained image compression ML model 232 serving as an encoder, and ML model-based decoder 238. Also shown in FIG. 2A is uncompressed input image 216, latent space representation 234 of input image 216, quantized latents 236, and decoded image 218 corresponding to uncompressed input image 216. It is noted that the features of ML model-based video codec architecture 224 shown in FIG. 2A may be included among ML model-based codec software resources 130, in FIG. 1.

According to the exemplary implementation shown in FIG. 2A, a mapping from image space to latent space is realized with ML model-based video codec architecture 224, where the bottleneck values constitute the latent representation. The function g denotes the mapping from image space to latent space performed by trained image compression ML model 232, and $g^{-1}$ denotes the reverse mapping. An image x is first mapped to its latent representation y=g(x). After quantization, the resulting quantized latents ŷ are encoded losslessly to a bitstream that can be decoded into the image $\hat{x}=g^{-1}(\hat{y})$ as shown in FIG. 2A.

Image compression can formally be expressed as minimizing the expected length of the bitstream as well as the expected distortion of the reconstructed image compared to the original, formulated as optimizing the following rate-distortion objective function:

$$L_{g,p_{\hat{y}}} = \mathbb{E}_{x \sim p_x}[-\log_2 p_{\hat{y}})(\hat{y}) + \lambda d(x,\hat{x})] \quad \text{(Equation 1)}$$

where: $-\log_2 p_{\hat{y}})(\hat{y})$ is the rate term and $d(x, \hat{x})$ is the distortion term.

It is noted that in the notation used in Equation 1, the parameters of g include $g^{-1}$. Here d indicates a distortion measure and can include a combination of $\ell_2$, structural similarity index measure (SSIM), learned perceptual image patch similarity (LPIPS), and the like. The rate corresponds to the length of the bitstream needed to encode the quantized representation ŷ, based on a learned entropy model $p_{\hat{y}}$ over the unknown distribution of natural images $p_x$. By reducing the weight λ, better compression can be achieved at the cost of larger distortion on the reconstructed image.

According to one implementation of the present novel and inventive concepts, the neural image compression formulation described above can be augmented with an ML model in the form of a conditional GAN. In such a case of adversarial training, D is denoted as the discriminator neural network that learns to distinguish between the ground truth x and the decoded images x̂ conditioned on the latent representation ŷ:

$$L_D = \mathbb{E}_{x \sim p_x}[-\log(1-D(\hat{x},\hat{y})) - \log(D(x,\hat{y}))] \quad \text{(Equation 2)}$$

The training of the discriminator is alternated with the training of image compression ML model 232, in which case the rate-distortion objective augmented with the adversarial loss is optimized:

$$L_{g,p_{\hat{y}}} = \mathbb{E}_{x \sim p_x}[-\log_2 p_{\hat{y}}(\hat{y}) + \lambda d(x,\hat{x}) + \beta \log D(\hat{x},\hat{y})] \quad \text{(Equation 3)}$$

where: $-\log_2 p_{\hat{y}}(\hat{y})$ and $d(x, \hat{x})$ remain the rate and distortion terms, respectively, while $D(\hat{x}, \hat{y})$ is the adversarial loss.

In order to take advantage of temporal redundancy in video encoding, video compression relies on formation transfer through motion compensation, More precisely, a subsequent frame $x_{t+1}$ (identified in FIGS. 2B and 2C by reference number 217) can be predicted from its preceding frame $x_t$ by considering motion information. As defined in the present application, the expression "motion compensation" refers to the full process that computes and encodes motion vectors, as well as any post-processing that may occur. Motion compensation is denoted as MC by reference number 240 in FIGS. 2B and 2C and results in generation of motion compensated frame 219 ($\tilde{s}_{t+1}$). For simplicity, it is assumed that motion compensation has been completed, and the result is an estimate of the image $\tilde{x}_{t+1}$ and a motion vector field $\hat{m}_{t+1}$.

However, it is noted that the video compression techniques described below by reference to FIGS. 2B and 2C do not require that a single preceding reference frame $x_t$ be used for motion estimation. In various use cases, one, or multiple frames can be used for motion compensation. Moreover, that frame or those frames that is/are used for motion compensation need not be located in the causal region of the video. By way of example, bidirectional prediction can be performed such that a particular frame can draw motion estimation from future frames, as well as preceding frames, thereby effectively decoupling playback order and encoding order.

Two strategies for leveraging a trained image compression ML model to compress the residual information needed to fix the current estimate $\tilde{x}_{t+1}$ are described below. The first strategy is referred to as "knowledge distillation with latent space residuals" and the second strategy is referred to as "knowledge distillation with image space residuals."

Figure 2B:
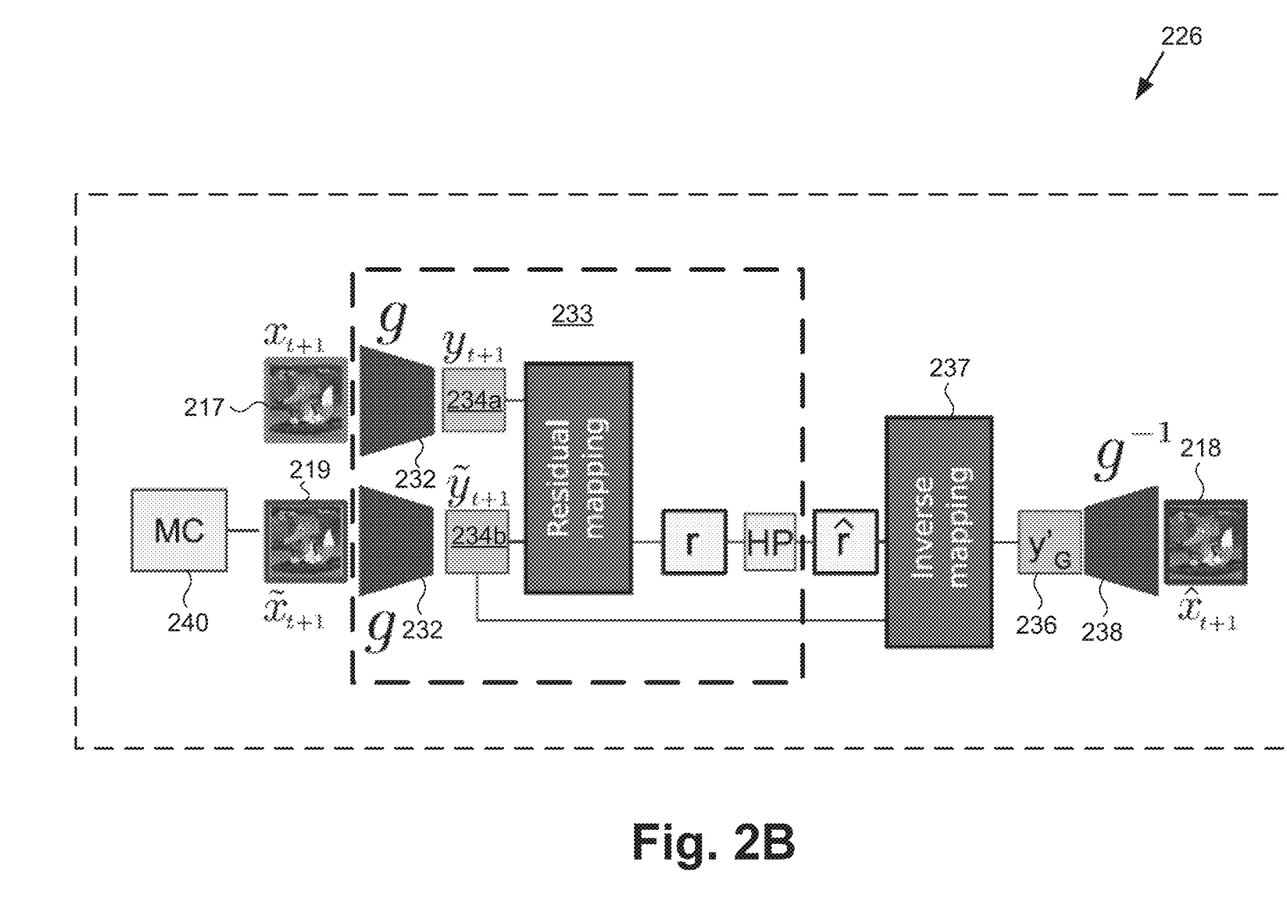
FIG. 2B shows a diagram of an exemplary ML model-based video codec architecture, according to another implementation.

Knowledge Distillation with Latent Space Residuals:

FIG. 2B shows a diagram of exemplary ML model-based video codec architecture 226, according to another implementation, that utilizes latent space representation 234a ($y_{t+1}$), of original frame 217 ($x_{t+1}$), and the latent space representation 234b ($\tilde{y}_{t+1}$) of motion compensated frame 219 ($\tilde{x}_{t+1}$). As shown in FIG. 2B, ML model-based video codec architecture 226 includes ML model-based video compression encoder 233 and image compression ML model 232. The residual mapping performed by ML model-based video compression encoder 233 and its reverse mapping are denoted respectively as h and $h^{-1}$. The residual mapping h extracts residual information r from the two latent representation $y_{t+1}$ and $\tilde{y}_{t+1}$. This information r is referred to as residual because the objective is to encode as little information as possible to complete $\tilde{y}_{t+1}$ and recover $\hat{x}_{t+1}$. It is noted that the features of ML model-based video codec architecture 226 shown in FIG. 2B may be included among ML model-based codec software resources 130, in FIG. 1. That is to say, in some implementations, ML model based codec software resources 130 may include ML model-based video compression encoder 233 and image compression ML model 232.

As the residual mapping function h and its reverse $h^{-1}$ operate on a single instant, time can be omitted from the notation that follows. The following definitions are established: $r=h(y, \hat{y})$ and $\hat{y}=h^{-1}(\hat{r}, \hat{y})$. It is noted that because $\tilde{y}_{t+1}$ is obtained via motion compensation it is available both at encoding and decoding time. This solution is designed to leverage the image compression ML model g trained with the adversarial loss. The parameters of image compression ML model g remain unchanged. To achieve this residual compression, the parameters of the residual mapping h (including its reverse $h^{-1}$) and the parameters of the probability model $p_{\hat{r}}$ need to be trained. This can be done by optimizing the following rate distortion loss:

$$L_{h, p_{\hat{r}}} = \mathbb{E}_{x \sim p_x}[-\log_2 p_{\hat{r}}(\hat{r}) + \lambda d(g^{-1}(h^{-1}(\hat{r})), \hat{x})] \qquad \text{(Equation 4)}$$

where: $-\log_2 p_{\hat{r}}(\hat{r})$ is the rate term and d(g) is the distortion term.

It is noted that the target frames are no longer the ground truth but are now the output of the image compression ML model g. This enables the performance of knowledge distillation and retains the detail hallucination capabilities of the adversarially trained image compression model. The residual mapping itself can be implemented as a combination of several techniques, as described in greater detail in the attached paper, titled "Knowledge Distillation for GAN Based Video Codec," which is hereby incorporated fully by reference: into the present application.

Figure 2C:
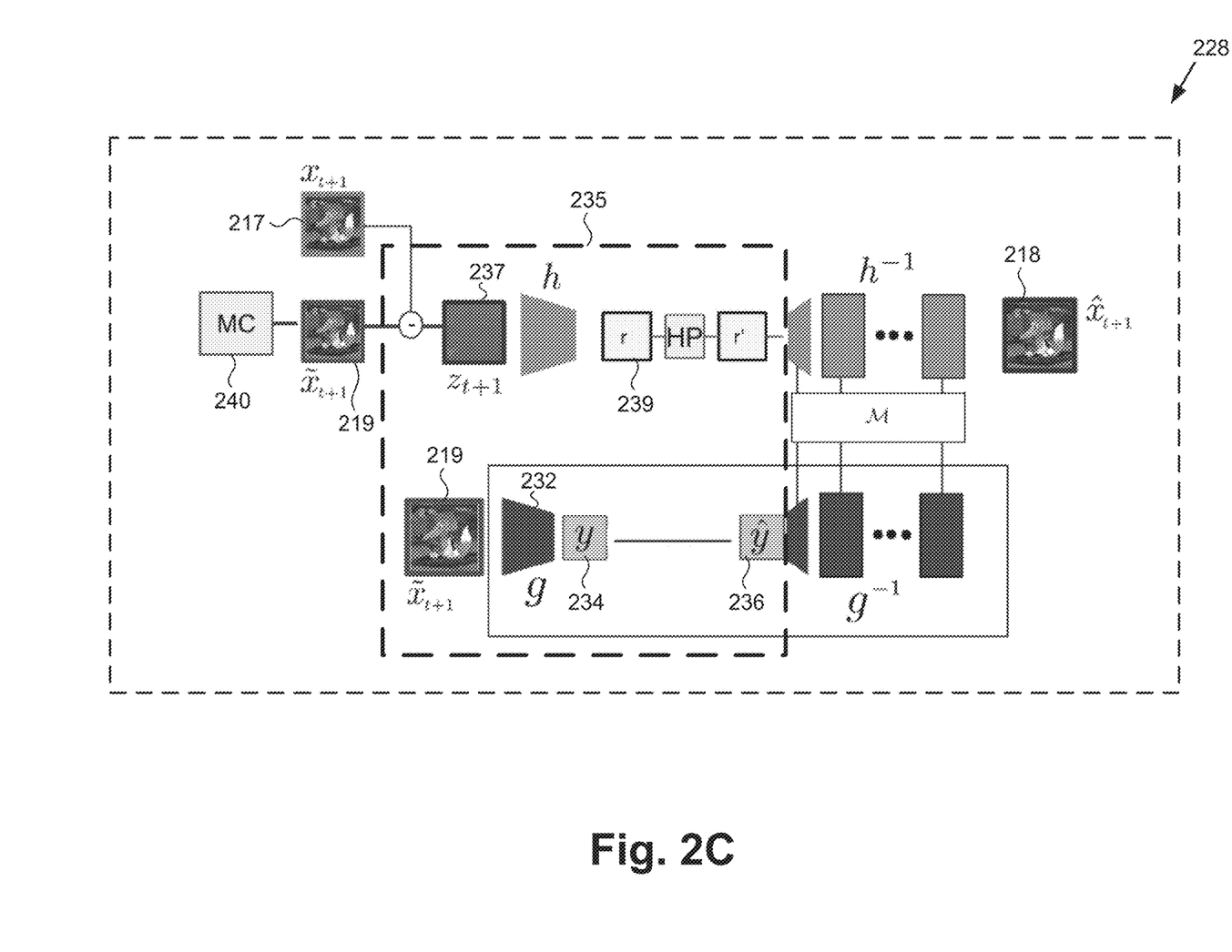
FIG. 2C shows a diagram of an exemplary ML model-based video codec architecture, according to yet another implementation.

Knowledge Distillation with Image Space Residuals:

A different approach to leverage the available trained image compression ML model g is to work with image space residuals as represented by exemplary ML model-based video codec architecture 228, in FIG. 2C. Similarly to the latent residual case, it is assumed that motion compensation has been completed and it is only necessary to encode the difference between the current frame $x_{t+1}$ and motion compensated frame and identified by reference number 219 in FIG. 2C. As shown in FIG. 2C, ML model-based video codec architecture 228 includes ML model-based video compression encoder 235 and image compression ML model 232. It is noted that the features of ML model-based video codec architecture 228 shown in FIG. 2C may be included among ML model-based codec software resources 130, in FIG. 1. That is to say, in some implementations, ML model-based codec software resources 130 may include ML model-based video compression encoder 235 and image compression ML model 232.

The difference in the approach depicted by ML model-based video codec architecture 228, is that in the implementation shown in FIG. 2C the image space residual 237 corresponding to uncompressed frame 217 and identified as frame $z_{t+1}$ is encoded:

$$z_{t+1} = x_{t+1} - \hat{x}_{t+1} \qquad \text{(Equation 5)}$$

The neural encoder and neural decoder functions are denoted respectively as h and $h^{-1}$. They may be implemented as neural network layers as described above by reference to FIG. 2A. The function h will map image residual 237 into its latent space representation 239 denoted as r, however the decoder function $h^{-1}$ will directly decode the image. Consistent with the disclosed approach of leveraging features from the trained image compression ML model g, a merging function $\mathcal{M}$ is designed. The objective of this function is to integrate features from image compression ML model 232. In its simplest form, this merging function can be implement as a masking mechanism that take binary values 0, 1 to indicate which features to use and the selection can be done after exhaustive experimentation with possible combinations. In a more sophisticated design the masks can be learned during training and optionally conditioned on the image itself.

The training loss may be expressed as:

$$L_{h, p_{\hat{r}}} = \mathbb{E}_{x \sim p_x}[-\log_2 p_{\hat{r}}(\hat{r}) + \lambda d(x_{t+1}, \hat{x}_{t+1}) + \beta \log D(x^*_{t+1}, \hat{x}_{t+1})] \qquad \text{(Equation 6)}$$

where $-\log_2 p_{\hat{r}}(\hat{r})$ is the rate term, $d(x_{t+1}, \hat{x}_{t+1})$ is the distortion term, and $D(x^*_{t+1}, \hat{x}_{t+1})$ is the adversarial loss. It is noted that the training loss expressed by Equation 6 includes an adversarial loss against $x^*_{t+1}$. This corresponds to the image compressed as a single frame with the trained image compression ML model g.

Temporal instability, such as flickering mismatch between hallucinated details, and the like, can occur in both of the knowledge distillation processes described above. In order to maintain temporally stable results, a temporal smoothing component can be added. More formally, given the previously decoded frame $\hat{x}_t$ and motion vectors $\hat{m}_t$ the objective is to process the frame $\hat{x}_{t+1}$ to remove any temporal artifact:

$$\hat{x}^*_{t+1} = F(\hat{x}_{t+1}, W(\hat{x}^*_t, \hat{m}_t)) \qquad \text{(Equation 7)}$$

with the * superscript indicating a temporally processed frame. W is the image warping function that uses the motion field $\hat{m}_t$ to warp the previous frame $\hat{x}^*_t$ to match the current frame $\hat{x}_{t+1}$. It is noted that rather than a single previously decoded frame, in some implementations $\hat{x}_t$ may represent multiple frames. In implementations in which multiple previously decoded frames are utilized, each motion vector $\hat{m}_t$ may be treated as a pair of data points including the displacement and the reference frame index.

The correcting function F may be implemented as an NN and may be trained using the following loss:

$$L_F = \mathbb{E}_{x \sim p_x}[M \odot d(\hat{x}^*_{t+1}, W(\hat{x}^*_t, \hat{m}_t)) + \lambda \log D(\hat{x}^*_t, \hat{x}_{t+1})] \qquad \text{(Equation 8)}$$

where $M \odot d(\hat{x}^*_{t+1}, W(\hat{x}^*_t, \hat{m}_t))$ is the temporal term and $\log D(\hat{x}^*_t, \hat{x}_{t+1})$ is the optional adversarial loss term, with d a distortion error that penalizes deviation between the two consecutive frame appearances to enforce temporal stability (it can be the $\ell_1$ loss for example). M is a merging function that may be implemented as a binary mask that indicates where motion vectors a valid to limit the penalty to regions where motion is correctly estimated. Finally, as an option, an adversarial loss may be added to avoid over-smoothing the final output.

Figure 3:
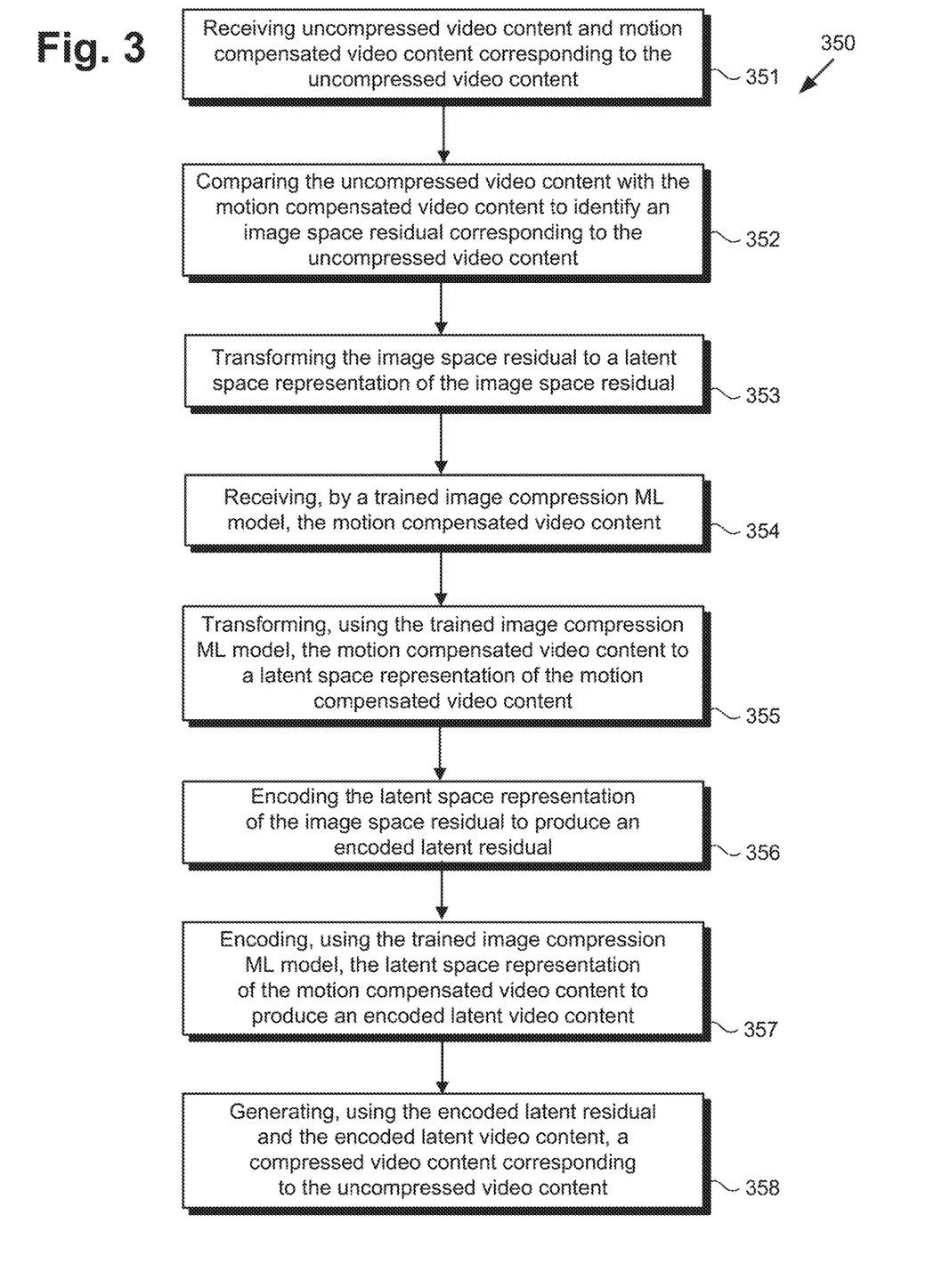
FIG. 3 shows a flowchart outlining an exemplary method for performing ML model-based video compression, according to one implementation.

The knowledge distillation with image space residuals approach corresponding to exemplary ML model-based video codec architecture 228, in FIG. 2C, will be further described by reference to FIG. 3. FIG. 3 shows flowchart 350 presenting an exemplary method for performing ML model-based video compression, according to one implementation. With respect to the method outlined in FIG. 3, it is noted that certain details and features have been left out of flowchart 350 in order to not obscure the discussion of the inventive features in the present application.

Referring now to FIG. 3 in combination with FIGS. 1 and 2C, flowchart 350 includes receiving uncompressed video content (e.g., uncompressed frame 217) and motion compensated video content motion compensated frame 219) corresponding to the uncompressed video content (action 351). As shown in FIG. 2C, uncompressed frame 217 and motion compensated frame 219 may be received in action 351 by ML model-based video compression encoder 235. Moreover, and as noted above by further reference to FIG. 1, ML model-based video compression encoder 235 may be included among ML model-based codec software resources 130 and stored in system memory 106. Thus, uncompressed frame 217 and motion compensated frame 219 may be received in action 351 by ML model-based video compression encoder 235 executed by processing hardware of 104 of system 100.

Flowchart 350 further includes comparing the uncompressed video content with the motion compensated video content to identify image space residual 237 corresponding to the uncompressed video content (action 352). Continuing to refer to FIGS. 1 and 2C in combination, uncompressed frame 217 and motion compensated frame 219 may be compared, and image space residual identified, in action 352 by ML model-based video compression encoder 235, executed by processing hardware of 104 of system 100.

Flowchart 350 further includes transforming image space residual 237 to latent space representation 239 of image space residual 237 (action 353). Image space residual 237 may be transformed to latent space representation 239 of image space residual 237 in action 353 by ML model-based video compression encoder 235, executed by processing hardware of 104 of system 100, and using neural encoder function h.

Flowchart 350 further includes receiving, using trained image compression ML model 232, the motion compensated video content (e.g., motion compensated frame 219) (action 354). As noted above, trained image compression ML model 232 may include a trained NN, such as a trained GAN, for example. Moreover, and as noted above, in some implementations, trained image compression ML model 232 may include an NN trained using an objective function including an adversarial loss. Action 354 may be performed by ML model-based video compression encoder 235, executed by processing hardware of 104 of system 100.

Flowchart 350 further includes transforming, using trained image compression ML model 232, the motion compensated video content represented by motion compensated frame 219 to latent space representation 234 of the motion compensated video content (action 355). As shown by FIG. 2C, motion compensated frame 219 may be transformed to its latent space representation 234 by ML model-based video compression encoder 235, using trained image compression ML model 232, i.e., g, ML model-based video compression encoder 235 may be executed to perform action 355 using image compression ML model 232, by processing hardware 104 of system 100.

It is noted that although flowchart 350 depicts actions 354 and 355 as following action 351, 352, and 353, that representation is provided merely by way of example. In some other implementations, action 354 and 355 may be performed in sequence, but in parallel, i.e., substantially concurrently, with actions 351, 352, and 353. In still other implementations, action 354, or actions 354 and 355 may precede one or more of actions 351, 352, and 353.

Flowchart 350 further includes encoding latent space representation 239 of image space residual 237 to produce an encoded latent residual (action 356). Latent space representation 239 of image space residual 237 may be encoded in action 356 to produce the encoded latent residual by ML model-based videos compression encoder 235, executed by processing hardware 104 of system 100.

Flowchart 350 further includes encoding, using trained image compression ML model 232, latent space representation 234 of motion compensated frame 219 to produce encoded latent video content (action 357). Latent space representation 234 of motion compensated frame 219 may be encoded in action 357 to produce the encoded latent video content by ML model-based video compression encoder 235, executed by processing hardware 104 of system 100, and using trained image compression ML model 232.

It is noted that although flowchart 350 depicts action 357 as following action 356, that representation is provided merely by way of example. The only constraint placed on the timing of action 357 is that it follows action 355, while the only constraint placed on the timing of action 356 is that it follows action 353. Thus, in various implementations, action 357 may follow action 356, may precede action 356, or may be performed in parallel i.e., substantially concurrently with, action 356. That is to say, in some implementations, the encoded latent residual produced in action 356 and the encoded latent video content produced in action 357 may be produced in parallel.

Referring to FIGS. 1 and 3 in combination, flowchart 350 further includes generating, using the encoded latent residual produced in action 356 and the encoded latent video content produced in action 357, compressed video content 117 corresponding to uncompressed video content 116 (action 358). In some implementations, compressed video content 117 corresponding to uncompressed video content 116 may be generated based on the difference between the encoded latent residual produced in action 356 and the encoded latent video content produced in action 357. Further referring to FIG. 2C, compressed video content 117 may be produced in action 358 by ML model-based video compression encoder 235, executed by processing hardware 104 of system 100.

Figure 4:
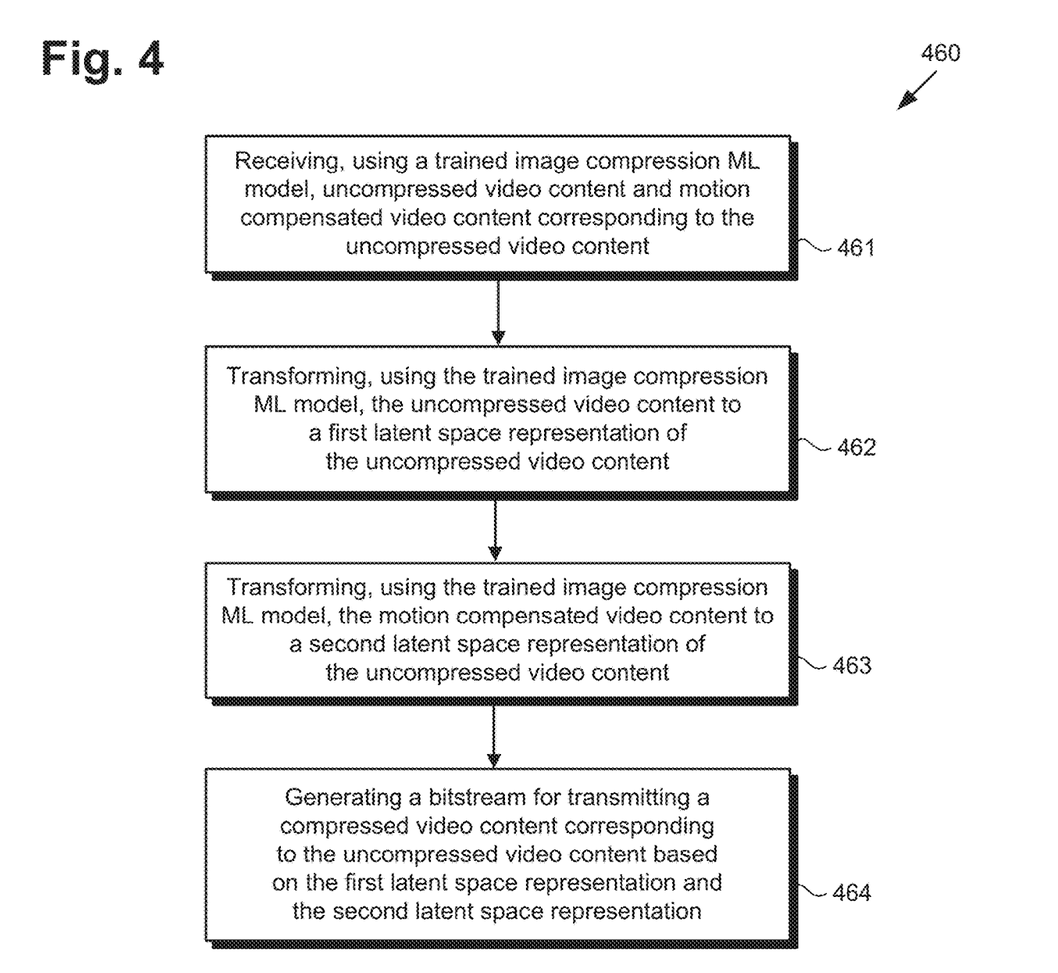
FIG. 4 shows a flowchart outlining an exemplary method for performing ML model-based video compression, according to another implementation.

The knowledge distillation with latent space residuals approach corresponding to exemplary ML model-based video codec architecture 226, in FIG. 2B, will be further described by reference to FIG. 4. FIG. 4 shows flowchart 460 presenting an exemplary method for performing ML model-based video compression, according to another implementation. With respect to the method outlined in FIG. 4, it is noted that certain details and features have been left out of flowchart 460 in order to not obscure the discussion of the inventive features in the present application.

Referring now to FIG. 4 in combination with FIGS. 1 and 2B, flowchart 460 includes receiving, using trained image compression ML model 232, uncompressed video content (e.g., uncompressed frame 217) and motion compensated video content (e.g., motion compensated frame 219) corresponding to the uncompressed video content (action 461). As shown in FIG. 2B, uncompressed frame 217 and motion compensated frame 219 may be received in action 461 by ML model-based video compression encoder 233, using trained image compression ML model 232. As noted above, trained image compression ML model 232 may include a trained NN, such as a trained GAN, for example. Moreover, and as noted above, in some implementations, trained image compression ML model 232 may include an NN trained using an objective function including an adversarial loss. In addition, and as noted above by further reference to FIG. 1, ML model-based video compression encoder 233 may be included among ML model-based codec software resources 130 and stored in system memory 106. Thus, uncompressed frame 217 and motion compensated frame 219 may be received in action 461 by ML model-based video compression encoder 233 executed by processing hardware of 104 of system 100.

Flowchart 460 further includes transforming, using trained image compression ML model 232, the uncompressed video content represented by uncompressed frame 217 to first latent space representation 234a of the uncompressed video content (action 462). As shown by FIG. 2B, uncompressed frame 217 may be transformed to its latent space representation 234a by ML model-based video compression encoder 233, using trained image compression ML model 232, i.e., g. ML model-based video compression encoder 233 may be executed to perform action 462 using image compression ML model 232, by processing hardware 104 of system 100.

Flowchart 460 further includes transforming, using trained image compression ML model 232, the uncompressed video content represented by motion compensated frame 219 to second latent space representation 234b of the uncompressed video content (action 463). As shown by FIG. 2B, motion compensated frame 219 may be transformed to latent space representation 234b by ML model-based video compression encoder 233, using trained image compression ML model 232, i.e., g. ML model-based video compression encoder 233 may be executed to perform action 463 using image compression ML model 232, by processing hardware 104 of system 100.

It is noted that although flowchart 460 depicts action 463 as following action 462, that representation is provided merely by way of example. In various implementations, action 463 may follow action 462, may precede action 462, or may be performed in parallel with, i.e., substantially concurrently with, action 462. That is to say, in some implementations, the transformation of the uncompressed video content to first latent space representation 234a, and the transformation of the motion compensated video content to second latent space representation 234b, may be performed in parallel.

Flowchart 460 further includes generating a bitstream for transmitting compressed video content 117 corresponding to uncompressed video content 116 based on first latent space representation 234a and second latent space representation 234b (action 464). In some implementations, action 464 may include determining, using first latent space representation 234a and second latent space representation 234b, a latent space residual. For example, such a latent space residual may be based on the difference between first latent space representation 234a and second latent space representation 234b. In implementations in which a latent space residual is determined as part of action 464, the bitstream for transmitting compressed video content 117 corresponding to uncompressed video content 116 may be generated using the latent space residual. Generation of the bitstream for transmitting compressed video content 117, in action 464, may be performed by ML model-based video compression encoder 233, executed by processing hardware 104 of system 100.

With respect to the actions represented in FIGS. 3 and 4, it is noted that in various implementations, actions 351, 352, 353, 354, 355, 356, 357, and 358 of flowchart 350, or actions 461, 462, 463, and 464 of flowchart 460, max be performed as automated processes from which human participation may be omitted.

Thus, the present application discloses a framework including an ML model-based video compression solution based on knowledge distillation and latent space residual to enable use of a video compression codec that has similar hallucination capacity to a trained GAN, which is particularly important when targeting low bit-rate video compression. The present ML model-based video compression solution advances the state-of-the-art by providing images that are visually pleasing without requiring a high bit-rate. Some image details synthesized when using an ML model-based video codec may look realistic while deviating slightly from the ground truth. Nevertheless, the present ML model-based video compression solution is advantageously capable of providing image quality that would be impossible using the same amount of transmitted data in conventional approaches.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a processing hardware and a system memory storing a machine learning (ML) model-based video compression encoder and a trained image compression ML model;
   the processing hardware configured to execute the ML model-based video compression encoder to:
   receive an uncompressed video content and a motion compensated video content corresponding to the uncompressed video content;
   compare the uncompressed video content with the motion compensated video content to identify an image space residual corresponding to the uncompressed video content;
   transform the image space residual to a latent space representation of the image space residual;
   receive, using the trained image compression ML model, the motion compensated video content;
   transform, using the trained image compression ML model, the motion compensated video content to a latent space representation of the motion compensated video content;
   encode the latent space representation of the image space residual to produce an encoded latent residual;
   encode, using the trained image compression ML model, the latent space representation of the motion compensated video content to produce an encoded latent video content; and
   generate, using the encoded latent residual and the encoded latent video content, a compressed video content corresponding to the uncompressed video content.

2. The system of claim 1, wherein the encoded latent residual and the encoded latent video content are produced in parallel.

3. The system of claim 1, wherein the processing hardware is configured to execute the ML model-based video compression encoder to generate the compressed video content corresponding to the uncompressed video content based on a difference between the encoded latent residual and the encoded latent video content.

4. The system of claim 1, wherein the trained image compression ML model comprises a trained artificial neural network (NN).

5. The system of claim 4, wherein the trained NN is trained using an objective function including an adversarial loss.

6. The system of claim 4, wherein the trained NN comprises a generative adversarial network (GAN).

7. A method for use by a system including a computing platform having a processing hardware and a system memory storing a machine learning (ML) model-based video compression encoder and a trained image compression ML model, the method comprising:
- receiving, by the ML model-based video compression encoder executed by the processing hardware, an uncompressed video content and a motion compensated video content corresponding to the uncompressed video content;
- comparing, by the ML model-based video compression encoder executed by the processing hardware, the uncompressed video content with the motion compensated video content, thereby identifying an image space residual corresponding to the uncompressed video content;
- transforming, by the ML model-based video compression encoder executed by the processing hardware, the image space residual to a latent space representation of the image space residual;
- receiving, by the trained image compression ML model executed by the processing hardware, the motion compensated video content;
- transforming, by the trained image compression ML model executed by the processing hardware, the motion compensated video content to a latent space representation of the motion compensated video content;
- encoding, by the ML model-based video compression encoder executed by the processing hardware, the latent space representation of the image space residual to produce an encoded latent residual;
- encoding, by the trained image compression ML model executed by the processing hardware, the latent space representation of the motion compensated video content to produce an encoded video content; and
- generating, by the ML model-based video compression encoder executed by the processing hardware and using the encoded latent residual and the encoded latent video content, a compressed video content corresponding to the uncompressed video content.

8. The method of claim 7, wherein the encoded latent residual and the encoded latent video content are produced in parallel.

9. The method of claim 7, wherein the compressed video content corresponding to the uncompressed video content is generated based on a difference between the encoded latent residual and the encoded latent video content.

10. The method of claim 7, wherein the trained image compression ML model comprises a trained artificial neural network (NN).

11. The method of claim 10, wherein the trained NN is trained using an objective function including an adversarial loss.

12. The method of claim 7, wherein the trained NN comprises a generative adversarial network (GAN).

13. A system comprising:
- a computing platform including a processing hardware and a system memory storing a machine learning (ML) model-based video compression encoder and a trained image compression ML model;
- the processing hardware configured to execute the ML model-based video compression encoder to:
  - receive, using the trained image compression ML model, an uncompressed video content and a motion compensated video content corresponding to the uncompressed video content;
  - transform, using the trained image compression ML model, the uncompressed video content to a first latent space representation of the uncompressed video content;
  - transform, using the trained image compression ML model, the motion compensated video content to a second latent space representation of the uncompressed video content; and
  - generate a bitstream for transmitting a compressed video content corresponding to the uncompressed video content based on the first latent space representation and the second latent space representation.

14. The system of claim 13, wherein the processing hardware is further configured to execute the ML model-based video compression encoder to:
- determine, using the first latent space representation and the second latent space representation, a latent space residual.

15. The system of claim 14, wherein the processing hardware is further configured to execute the ML model-based video compression encoder to:
- generate the bitstream for transmitting the compressed video content corresponding to the uncompressed video content using the latent space residual.

16. The system of claim 14, wherein the latent space residual is based on a difference between the first latent space representation and the second latent space representation.

17. The system of claim 13, wherein the transformation of the uncompressed video content to the first latent space representation, and the transformation of the motion compensated video content to the second latent space representation, are performed in parallel.

18. The system of claim 13, wherein the trained image compression ML model comprises a trained artificial neural network (NN).

19. The system of claim 13, wherein the trained NN is trained using an objective function including an adversarial loss.

20. The system of claim 13, wherein the trained NN comprises a generative adversarial network (GAN).

* * * * *